(12) United States Patent
Owen et al.

(10) Patent No.: US 9,856,973 B1
(45) Date of Patent: Jan. 2, 2018

(54) SYSTEM AND METHOD FOR TRANSMISSION WITH CREEPER MODE SELECTION

(71) Applicant: Deere & Company, Moline, IL (US)

(72) Inventors: Amanda K. N. Owen, Cedar Falls, IA (US); Narasimhan Rangan, Cedar Falls, IA (US); Zachary Kail, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/204,746

(22) Filed: Jul. 7, 2016

(51) Int. Cl.
| | |
|---|---|
| *F16H 59/02* | (2006.01) |
| *F16H 61/02* | (2006.01) |
| *F16H 63/30* | (2006.01) |
| *F16H 59/10* | (2006.01) |
| *F16H 61/24* | (2006.01) |
| *F16H 59/08* | (2006.01) |

(52) U.S. Cl.
CPC ....... *F16H 61/0204* (2013.01); *F16H 59/105* (2013.01); *F16H 61/24* (2013.01); *F16H 63/3023* (2013.01); *F16H 2059/082* (2013.01); *F16H 2061/247* (2013.01)

(58) Field of Classification Search
None
See application file for complete search history.

(56) References Cited

U.S. PATENT DOCUMENTS

| | | | | |
|---|---|---|---|---|
| 4,974,474 A | * | 12/1990 | Newbigging | F16H 3/095 477/122 |
| 4,998,450 A | * | 3/1991 | Nogle | F16H 59/105 200/61.88 |
| 5,224,392 A | * | 7/1993 | Hutchison | F16H 61/705 74/335 |
| 6,109,126 A | * | 8/2000 | Cochran | F16H 61/702 477/908 |
| 7,395,730 B2 | * | 7/2008 | Kramer | F16H 59/02 74/335 |
| 8,943,922 B2 | | 2/2015 | Wikner et al. | |
| 9,026,320 B2 | * | 5/2015 | Shirao | B60W 10/30 414/685 |
| 9,086,120 B2 | | 7/2015 | Ore et al. | |
| 2015/0184726 A1 | | 7/2015 | Rekow et al. | |

OTHER PUBLICATIONS

Rushikesh Chaudhari, et al., A Safety Creeper Interlock System, Indian Patent Application No. 201621004846 filed Feb. 11, 2016.

* cited by examiner

*Primary Examiner* — Dirk Wright
(74) *Attorney, Agent, or Firm* — Lorenz & Kopf, LLP

(57) ABSTRACT

A mechanical creeper mode selection system for a transmission of a work vehicle is provided, in which the transmission includes one or more range modes having one or more range mode shift mechanisms each driven by an electrohydraulic circuit. The system includes a creeper mode selection lever movable by an operator to select a creeper gear range. The system also includes a sensor that observes a position of the creeper mode selection lever and generates sensor signals based thereon. The system includes a controller that processes the sensor data to determine a movement of the creeper mode selection lever and outputs one or more control signals to the electrohydraulic circuit to position the one or more range mode shift mechanisms in a range neutral mode based on the movement of the creeper mode selection lever.

20 Claims, 6 Drawing Sheets

SYSTEM AND METHOD FOR TRANSMISSION WITH CREEPER MODE SELECTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a work vehicle and the selection of a creeper mode of a transmission of the work vehicle.

BACKGROUND OF THE DISCLOSURE

In the agricultural industry, various work vehicle, such as tractors, can be used with various work implements to cultivate a field. Generally, the work vehicle comprises an engine coupled to a transmission, which transfers power generated by the engine to one or more driven wheels of the work vehicle, thereby controlling a speed of the work vehicle. In certain instances, however, a low gear range associated with the transmission may not be able to provide the work vehicle with a desired low speed. For example, during a tillage or planting operation, it may be desirable to operate the tractor in an ultra low speed, such that the tractor moves slowly or "creeps" along the field.

Accordingly, it is desirable to provide a system and a method for creeper mode selection for use with a transmission of a work vehicle. Furthermore, other desirable features and characteristics will become apparent from the subsequent detailed description and the appended claims, taken in conjunction with the accompanying drawings and the foregoing technical field and background.

SUMMARY OF THE DISCLOSURE

The disclosure provides a system and method for selecting a creeper mode of a transmission of a work vehicle.

In one aspect the disclosure provides a mechanical creeper mode selection system for a transmission of a work vehicle, in which the transmission includes one or more range modes having one or more range mode shift mechanisms each driven by an electrohydraulic circuit. The system includes a creeper mode selection lever movable by an operator to select a creeper gear range. The system also includes a sensor that observes a position of the creeper mode selection lever and generates sensor signals based thereon. The system includes a controller that processes the sensor data to determine a movement of the creeper mode selection lever and outputs one or more control signals to the electrohydraulic circuit to position the one or more range mode shift mechanisms in a range neutral mode based on the movement of the creeper mode selection lever.

In another aspect the disclosure provides a method for selecting a mechanical creeper mode for a transmission of a work vehicle, in which the transmission includes one or more range modes having one or more synchronizers driven by an electrohydraulic circuit. The method comprises: observing a position of a creeper mode selection lever with a sensor; determining, with a processor, a movement of the creeper mode selection lever based on signals from the sensor; and outputting, with the processor, one or more control signals to the electrohydraulic circuit to direct a flow of hydraulic fluid to position the one or more synchronizers in a range neutral mode based on the movement of the creeper mode selection lever.

In yet another aspect the disclosure provides a mechanical creeper mode selection system for a transmission of a work vehicle, in which the transmission includes one or more range modes having one or more synchronizers driven by an electrohydraulic circuit. The system comprises a creeper mode selection lever movable by an operator in a gate to select a creeper gear range. The gate includes at least a high creeper detent, a low creeper detent and a creeper neutral detent. The system includes a sensor coupled to the housing that observes a position of the creeper mode selection lever in the gate and generates sensor signals based thereon. The system also includes a controller that processes the sensor data to determine a movement of the creeper mode selection lever in the gate and outputs one or more control signals to the electrohydraulic circuit to position the one or more synchronizers in a range neutral mode based on the movement of the creeper mode selection lever from the creeper neutral detent.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
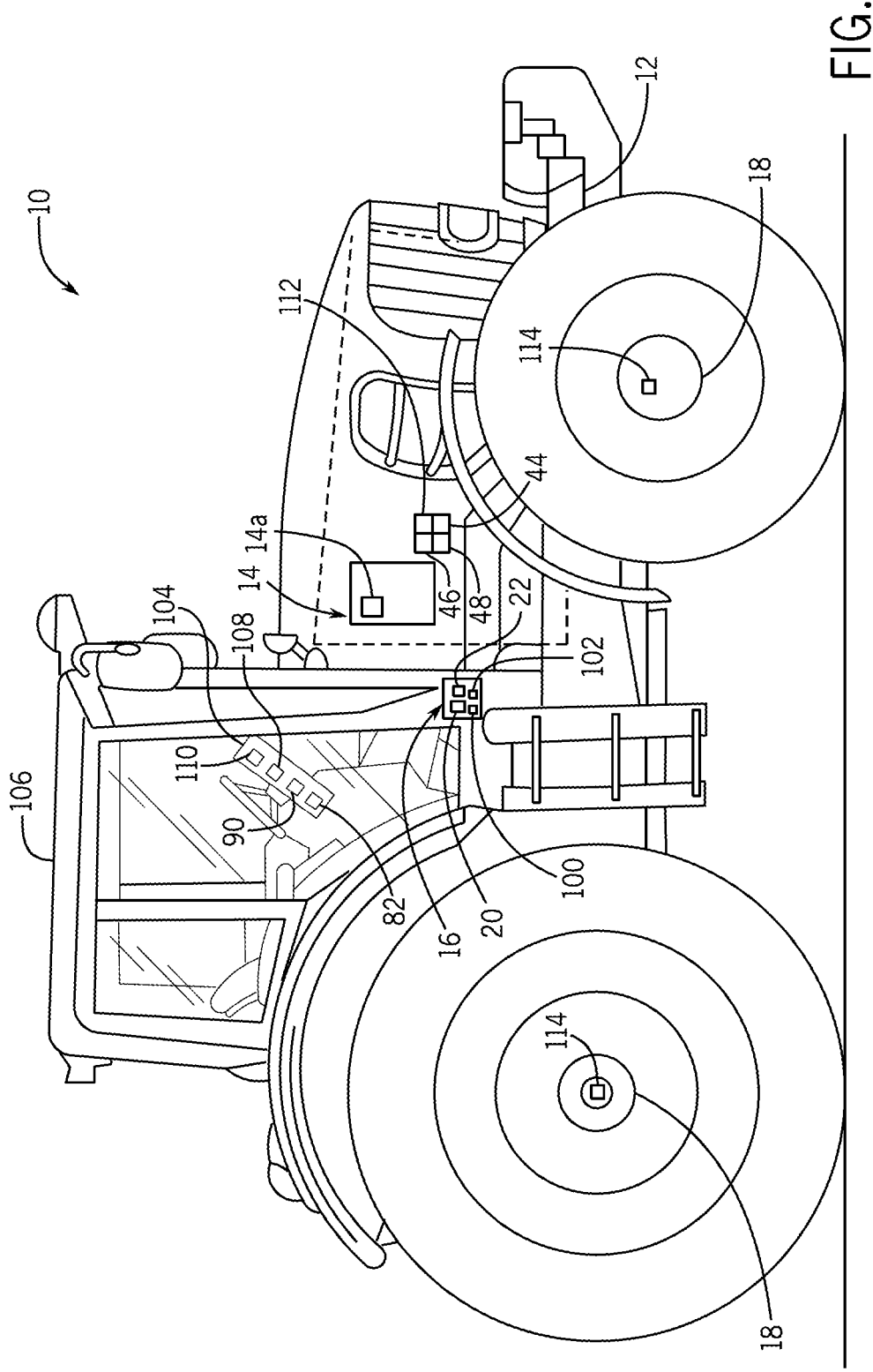
FIG. 1 is a perspective view of an example work vehicle in the form of a tractor in which the disclosed system and method for a transmission with creeper mode selection can be used.

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the tractor described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed system for creeper mode selection, as shown in the accompanying figures of the drawings described briefly above. Generally, the disclosed systems (and work vehicles in which they are implemented) provide for the selection of a mechanical creeper mode for a transmission of the work vehicle, which greatly reduces the ground speed of the work vehicle. In certain embodiments, the transmission of the work vehicle includes both an electrohydraulically actuated transmission and a mechanically actuated transmission, the electrohydraulically actuated transmission having one or more gear ranges and one or more range modes that are defined by one or more shift mechanisms, in this example, one or more synchronizers and/or one or more friction clutches, such as wet friction clutches, that are positioned by associated hydraulic pistons that are driven by one or more hydraulic pumps and/or control valves of a hydraulic circuit associated with the work vehicle based on receipt of one or more control signals from a controller. The mechanically actuated transmission includes one or more creeper gear ranges that are actuated by at least one creeper gear range shift mechanism, such as at least one creeper gear range shift collar, and the at least one creeper gear range shift collar is mechanically actuated via operator input to a creeper mode selection lever.

Generally, the following description relates to a work vehicle as a tractor. Discussion herein may sometimes focus on the example application of a tractor having a transmission that outputs torque to a rear differential and, optionally, a front axle. In other applications, other configurations are also possible. In some embodiments, for example, the transmission may output torque simply to the rear differential. Likewise, work vehicles in some embodiments may be configured as haulers or loaders, such as tractor loaders, crawler loaders or similar machines, or in various other ways.

Generally, the creeper mode selection system and method of the present disclosure enables a work vehicle having an electrohydraulically actuated transmission to shift into a mechanically actuated creeper mode. In certain examples, the electrohydraulically actuated portion of the transmission includes at least four gear ranges, and at least four range modes for the transmission; and the mechanically actuated portion of the transmission includes two gear ranges. It should be noted that other gear ranges and range mode configurations are also possible.

In the example of the present disclosure, the creeper mode is selected by an operator input to the creeper mode selection lever. The creeper mode selection lever is movable within a gate, which defines various detents, with each detent associated with a respective creeper gear range. In this example, the creeper gear range includes a high creeper gear range, a low creeper gear range and a creeper neutral gear range, and thus, the gate defines three detents. A position sensor is coupled to a housing that defines the gate, and observes a position of the creeper mode selection lever. In one example, the sensor is a Hall effect sensor, that is responsive to a magnetic field generated by a permanent magnet coupled to the creeper mode selection lever. Generally, the permanent magnet is coupled to a shaft of the creeper mode selection lever, and the creeper mode selection lever is movable in a lateral direction relative to the gate to shift between the various creeper gear ranges.

As the creeper mode selection lever is moved from the creeper neutral detent, the position sensor observes a change, such as an increase (or decrease), in a strength of the magnetic field of the magnet of the creeper mode selection lever. A controller receives and processes the sensor signals to determine that the creeper mode selection lever has moved, such that the creeper mode selection lever is no longer positioned in the creeper neutral detent based on an observed change in the strength of the magnetic field. Based on this determination, the controller optionally determines a speed of the work vehicle, based on sensor signals received from a sensor associated with the work vehicle, for example. Based on the creeper mode selection lever no longer being in the creeper neutral detent and optionally on the speed of the work vehicle, the controller outputs one or more control signals to the hydraulic circuit associated with the work vehicle to drive hydraulic pistons associated with one or more synchronizers of the transmission to move or shift the transmission into a range neutral mode. Upon movement of the creeper mode selection lever back into the creeper neutral detent, the position sensor observes a change, such as an increase (or decrease), in the strength of the magnetic field, due to the proximity of the permanent magnet of the creeper mode selection lever to the position sensor. The controller processes the sensor signals from the position sensor and determines that the creeper mode selection lever is in the creeper neutral detent, and enables the selection of a range mode for the electrohydraulically actuated portion of the transmission. In certain embodiments, the controller outputs one or more control signals to the hydraulic circuit associated with the work vehicle to drive hydraulic pistons associated with one or more synchronizers of the transmission to move or shift the transmission into a previously or last selected range mode. Thus, the creeper mode selection system and method of the present disclosure enables a transmission of the work vehicle to operate in either an electrohydraulically actuated mode, or a manual, mechanical creeper mode, based on a position of the creeper mode selection lever.

As noted above, the disclosed creeper mode selection system may be utilized with regard to various work vehicles, including tractors, loaders, graders, etc. Referring to FIG. 1, in some embodiments, the disclosed creeper mode selection system can be used with a work vehicle 10, such as a tractor, to enable the selection of one or more creeper or ultra low speed gear ranges associated with the operation of the work vehicle 10. In one example, the work vehicle 10 includes a vehicle frame 12. Supported on the vehicle frame 12 is a source of propulsion, such as an engine 14. The engine 14 supplies power to a transmission 16. In one example, the engine 14 is an internal combustion engine, such as a diesel engine, that is controlled by an engine control module 14a. It should be noted that the use of an internal combustion engine is merely an example, as the propulsion device can be a fuel cell, an electric motor, a hybrid-gas electric motor, etc.

The transmission 16 transfers the power from the engine 14 to a suitable driveline coupled to one or more driven wheels 18 (and tires) of the work vehicle 10 to enable the work vehicle 10 to move. In certain embodiments, the transmission 16 can comprise an electrohydraulic system 20 and a mechanical system 22. The electrohydraulic system 20 includes one or more electrohydraulically actuated gear ranges that are operable in a respective one or more range modes. The mechanical system 22 includes one or more mechanically actuated gear ranges, which are operated in one or more range modes. For example, with reference to FIG. 2, an exemplary transmission 16 for the work vehicle 10 is shown.

Figure 2:
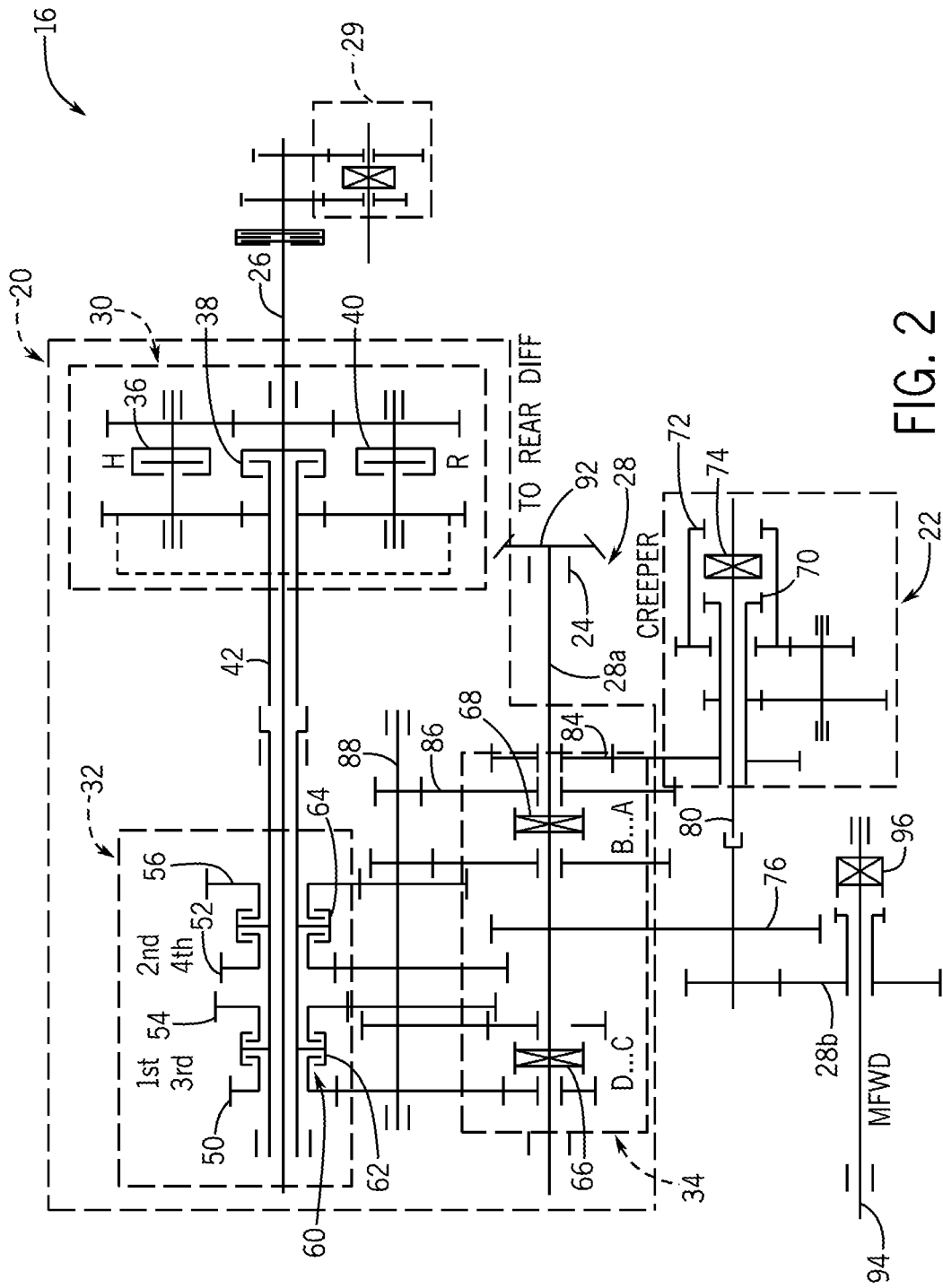
FIG. 2 is a schematic diagram of an example transmission for the work vehicle of FIG. 1.

In the example of FIG. 2, the transmission 16 includes the electrohydraulic system 20, the mechanical system 22, a dog tooth collar 24, an input shaft 26, one or more output shafts 28 and, optionally, a power takeoff (PTO) 29. The electrohydraulic system 20 includes one or more traction clutches 30, one or more gears 32 and one or more range mode shift mechanisms or selectors 34. In this example, the one or more traction clutches 30 include a high traction clutch 36, a low traction clutch 38 and a reverse traction clutch 40. Each of the traction clutches 30 are selectively coupled to a drive shaft 42 coupled to the input shaft 26 based on the receipt of one or more control signals from a controller 44 of the work vehicle 10 (FIG. 1), which drives a respective piston (not shown) associated with the selected one of the traction clutches 30, thereby causing the movement of the piston, and thus, the selected one of the traction clutches 30. In this example, the traction clutches 30 each comprise pistons, which apply pressure on friction discs to engage the respective one of the high traction clutch 36, the low traction clutch 38 and the reverse traction clutch 40. In various embodiments, the pistons associated with the traction clutches 30 can be actuated electrically, pneumatically or hydraulically. In the example of a hydraulic circuit, the controller 44 outputs one or more control signals to the one or more hydraulic pumps 46 and/or control valves 48 (FIG. 1) of the hydraulic circuit associated with the work vehicle 10 to move the traction clutches 30. Generally, the traction clutches 30 comprise wet friction clutches.

The one or more gears 32 cooperate with the one or more range mode selectors 34 to provide output power to the one or more output shafts 28. Stated another way, when a range mode is not selected, the electrohydraulic system 20 remains in a neutral position, with no output being provided to the one or more output shafts 28. In one example, the one or more gears 32 include a first gear 50, a second gear 52, a third gear 54 and a fourth gear 56. Each of the one or more gears 32 are selectively coupled to a drive shaft 58, which is coupled to the drive shaft 42, by one or more gear shift mechanisms or gear shift wet clutches 60. In this example, the one or more gear wet clutches 60 comprise a first wet clutch 62 and a second wet clutch 64. The first wet clutch 62 is movable to couple either the first gear 50 or the third gear 54 to the drive shaft 58, and the second wet clutch 64 is movable to couple either the second gear 52 or the fourth gear 56 to the drive shaft 58. Each of the first wet clutch 62 and the second wet clutch 64 are also movable into a neutral position by the hydraulic circuit. In this example, the first wet clutch 62 and the second wet clutch 64 are moved between the respective one or more gears 32 and the neutral position based on the receipt of one or more control signals from the controller 44 of the work vehicle 10 (FIG. 1), which drives the one or more hydraulic pumps 46 and/or control valves 48 (FIG. 1) of the hydraulic circuit to drive a respective hydraulic piston (not shown) associated with the selected one of the first wet clutch 62 and the second wet clutch 64, thereby causing the movement of the hydraulic piston, and thus, the first wet clutch 62 or the second wet clutch 64.

The one or more range mode selectors 34 cooperate with the one or more gears 32 to output power or torque to the one or more output shafts 28. In this example, the one or more range mode selectors 34 comprise a first range synchronizer 66 and a second range synchronizer 68. In this example, the first range synchronizer 66 and the second range synchronizer 68 each comprise synchromesh synchronizers. The first range synchronizer 66 is movable to select a C range mode or both a C range mode and a D range mode. The second range synchronizer 68 is movable to select an A range mode or a B range mode. Each of the first range synchronizer 66 and the second range synchronizer 68 are also movable into a neutral position by the hydraulic circuit (e.g. the one or more hydraulic pumps 46 and/or control valves 48 (FIG. 1)). In this example, the first range synchronizer 66 and the second range synchronizer 68 are moved between the respective one of the range modes (A, B, C, BCD, CD) based on the receipt of one or more control signals from the controller 44 of the work vehicle 10 (FIG. 1), which drives the one or more hydraulic pumps 46 and/or control valves 48 (FIG. 1) of the hydraulic circuit to drive a respective hydraulic piston (not shown) associated with the selected one of the first range synchronizer 66 and the second range synchronizer 68, thereby causing the movement of the hydraulic piston, and thus, the first range synchronizer 66 or the second range synchronizer 68. The first range synchronizer 66 and the second range synchronizer 68 are illustrated in the neutral position in FIG. 2. The first range synchronizer 66 and the second range synchronizer 68 are generally spring-centered, such that based on one or more control signals to disengage the hydraulic pumps and/or control valves 48, the first range synchronizer 66 and the second range synchronizer 68 are biased back into the neutral position. Thus, each of the first range synchronizer 66 and the second range synchronizer 68 are coupled to a biasing member or spring, which is biases the respective one of the first range synchronizer 66 and the second range synchronizer 68 into the neutral position, such that the one or more control signals drives the respective hydraulic piston to move the first range synchronizer 66 and the second range synchronizer 68 to the respective range mode (A, B, C, BCD, CD) by overcoming the force of the respective spring.

Generally, the one or more traction clutches 30 and the one or more gears 32 of the electrohydraulic system 20 cooperate to define a plurality of selectable gear ranges for the transmission 16. In this example, the one or more traction clutches 30 and the one or more gears 32 cooperate to define a forward gear range, a neutral gear range, a park gear range and a reverse gear range. Each of the gear ranges (forward, neutral, park, reverse) are selectable by an operator, via an input device, as will be discussed in greater detail herein.

The mechanical system 22 includes a high range creeper gear 70, a low range creeper gear 72, a creeper gear shift collar 74 and a mechanical interlock (not shown). The high range creeper gear 70 defines a first ultra low gear range for a creeper mode of the work vehicle 10, and the low range creeper gear 72 defines a second ultra low gear range for the creeper mode. The second low gear range results in a ground speed for the work vehicle 10, which is different, and generally less than, the ground speed that results from the high range creeper gear 70. The high range creeper gear 70 and the low range creeper gear 72 each result in ground speeds for the work vehicle 10 that are different than, and generally less than, the ground speeds that result from the electrohydraulic system 20. For example, the low range creeper gear 72 results in a ground speed of about 0.1 kilometer per hour (kph) to about 0.8 kilometer per hour (kph), while the first gear 50 in the A range mode results in a ground speed of about 1.0 kilometer per hour (kph) to about 2.0 kilometer per hour (kph). It should be noted that these ground speeds are merely exemplary, and moreover, the ground speeds may be reversed, depending upon the particular work vehicle. The output from the high range creeper gear 70 and the low range creeper gear 72 is coupled to the one or more output shafts 28 via creeper output shaft 80. In one example, a driving gear 76 can be coupled to the creeper output shaft 80 to transfer the output from the creeper output shaft 80 to the output shaft 28a. The creeper gear shift collar 74 is movable to select between the high range creeper gear 70, the low range creeper gear 72 and a creeper neutral position. In this example, the creeper gear shift collar 74 is mechanically coupled to a creeper mode selection lever 82 (FIG. 3) via a push-pull cable 75 (FIG. 3), for example, such that input to the creeper mode selection lever 82 moves or pushes the creeper gear shift collar 74 into engagement with the high range creeper gear 70 and moves or pulls the creeper gear shift collar 74 into engagement with the low range creeper gear 72. Generally, the creeper gear shift collar 74 has a zero-speed engagement, and is movable along a rail (not shown). Input torque to the mechanical system 22 is received via an input drive gear 84, which is mechanically coupled to a drive gear 86. Drive gear 86 is in turn coupled for rotation with a counter gear shaft 88. The counter gear shaft 88 is driven by one or more of the gears 32. The creeper gear shift collar 74 is illustrated in the neutral position in FIG. 2.

The mechanical interlock ensures that only the electrohydraulic system 20 or the mechanical system 22 is providing output torque to the one or more output shafts 28. In one example, the mechanical interlock comprises one or more interlock pins (not shown) that are movable via linkages upon the movement of a gear selector lever 90 (FIG. 5) out of a neutral position. Upon movement of the gear selector lever 90 out of the neutral position, the one or more interlock pins move and lock the creeper output shaft 80, thereby preventing the operation of the mechanical system 22 while the electrohydraulic system 20 is operational.

The park dog tooth collar 24 is capable of being coupled to a rear output shaft 28a. The park dog tooth collar 24 engages the rear output shaft 28a in an engaged position to prevent or inhibit the rotation of the rear output shaft 28a, thereby placing the work vehicle 10 in the park gear range. The park dog tooth collar 24 is movable between the engaged position and a disengaged position based on the receipt of one or more control signals from the controller 44 of the work vehicle 10 (FIG. 1), which drives the one or more hydraulic pumps 46 and/or control valves 48 (FIG. 1) of the hydraulic circuit to drive a respective hydraulic piston (not shown) associated with the park dog tooth collar 24, thereby causing the movement of the hydraulic piston, and thus, the park dog tooth collar 24.

The input shaft 26 is coupled to the engine 14 and receives as input the torque from the engine 14. The one or more output shafts 28 comprise the rear output shaft 28a and a front output shaft 28b. The rear output shaft 28a is coupled to a rear differential 92 associated with the work vehicle 10 to provide torque to drive a rear axle (not shown) associated with the work vehicle 10. The front output shaft 28b is selectively coupled to a front axle 94 associated with the work vehicle 10 to provide torque to drive the front axle 94. In one example, a dog clutch 96 is movable based on the receipt of one or more control signals from the controller 44 of the work vehicle 10 (FIG. 1), which drives the one or more hydraulic pumps 46 and/or control valves 48 (FIG. 1) to drive a respective hydraulic piston (not shown) associated with the dog clutch 96, thereby causing the movement of the hydraulic piston, and thus, the dog clutch 96 to engage or disengage the front output shaft 28b with the front axle 94. Generally, the dog clutch 96 has face-to-face engagement with the front axle 94.

With reference back to FIG. 1, the transmission 16 also includes one or more sensors 100. The one or more sensors 100 observe conditions of the transmission 16 and generate sensor signals based thereon. In this example, the one or more sensors 100 observe a current gear range and a current range mode associated with the electrohydraulic system 20 and generate sensor signals or sensor data based thereon. For example, the one or more sensors 100 can comprise one or more speed sensors, which observe a speed of the rear output shaft 28a and/or front output shaft 28b and generate sensor signals based thereon. As a further example, the one or more sensors 100 can comprise one or more hydraulic sensors, which observe a fluid pressure to one or more of the wet clutches 62, 64 and the synchronizers 66, 68, and generate sensor signals or sensor data based thereon. The one or more sensors 100 can also comprise position sensors, which observe a position of the wet clutches 62, 64 and the synchronizers 66, 68 and generate sensor signals or sensor data based thereon.

The transmission 16 also includes one or more sensors 102. The one or more sensors 102 observe conditions of the transmission 16 and generate sensor signals based thereon. In this example, the one or more sensors 102 observe a current creeper gear range of the mechanical system 22 and generate sensor signals or sensor data based thereon. For example, the one or more sensors 102 comprise one or more switches, such as ball switches, which observe a position of the push-pull cable 75 (FIG. 3) and generate sensor signals based thereon. In this example, the one or more sensors 102 can comprise a first, high range ball switch sensor and a second, low range ball switch sensor, which are each responsive to a movement of the creeper gear shift collar 74 (FIG. 3) to generate sensor signals or sensor data. In this regard, the ball switch is coupled to the creeper gear shift collar 74 such that the movement of the creeper gear shift collar 74 between the high range creeper gear 70 and the low range creeper gear 72 on the rail can close or open the ball switch associated with the respective one of the high range creeper gear 70 and the low range creeper gear 72, which provides a sensor signal that indicates the engagement of the creeper gear shift collar 74 with the respective one of the high range creeper gear 70 and the low range creeper gear 72.

The work vehicle 10 also includes the one or more hydraulic pumps 46, which can be driven by the engine 14 of the work vehicle 10. Flow from the hydraulic pumps 46 may be routed through various control valves 48 and various conduits (e.g., flexible hoses) in order to drive the hydraulic pistons (not shown) associated with the transmission 16. Flow from the hydraulic pumps 46 can also power various other components of the work vehicle 10. The flow from the hydraulic pumps 46 may be controlled in various ways (e.g., through control of the various control valves 48), in order to cause movement of the hydraulic pistons (not shown), and thus, the wet clutches 62, 64, the synchronizers 66, 68, the one or more traction clutches 30, the park dog tooth collar 24 and the dog clutch 96. In this way, for example, a movement of the wet clutches 62, 64, the synchronizers 66, 68, the one or more traction clutches 30, the park dog tooth collar 24 and the dog clutch 96 can be implemented by various control signals to the hydraulic pumps 46, control valves 48, and so on.

Generally, the controller 44 (or multiple controllers) may be provided, for control of various aspects of the operation of the work vehicle 10, in general. The controller 44 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 44 can be configured to execute various computational and control functionality with respect to the work vehicle 10 (or other machinery). In some embodiments, the controller 44 can be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 44 (or a portion thereof) may be configured as an assembly of hydraulic components (e.g., valves, flow lines, pistons, and so on), such that control of various devices (e.g., pumps, motors, the transmission 16) may be effected with, and based upon, hydraulic, mechanical, or other signals and movements.

The controller 44 may be in electronic, hydraulic, mechanical, or other communication with various other systems or devices of the work vehicle 10 (or other machinery). For example, the controller 44 is in electronic communication with various actuators, sensors, and other devices within (or outside of) the work vehicle 10, including various devices associated with the hydraulic pumps 46, control valves 48, and so on. The controller 44 can communicate with other systems or devices (including other controllers) in various known ways, including via a CAN bus (not shown) of the work vehicle 10, via wireless or electrical communication means, or otherwise. An example location for the controller 44 is depicted in FIG. 1. It will be understood, however, that other locations are possible including other locations on the work vehicle 10, or various remote locations.

In some embodiments, the controller 44 can be configured to receive input commands and to interface with an operator via a human-machine interface 104, which can be disposed inside a cab 106 of the work vehicle 10 for easy access by the operator. The human-machine interface 104 may be configured in a variety of ways. In some embodiments, the human-machine interface 104 may include one or more joysticks, various switches or levers, one or more pedals, one or more buttons, a touchscreen interface that may be overlaid on a display 108, a keyboard, a speaker, a microphone associated with a speech recognition system, or various other human-machine interface devices. Generally, the human-machine interface 104 also includes the creeper mode selection lever 82, the gear selector lever 90 and one or more range mode selection input devices 110. In one example, the one or more range mode selection input devices 110 comprise one or more buttons, which are actuatable by an operator to select a range mode (A, B, C, BCD or CD).

Various additional sensors may also be provided to observe various conditions associated with the work vehicle 10. In some embodiments, various sensors 112 (e.g., pressure, flow or other sensors) may be disposed near the hydraulic pumps 46 and control valves 48, or elsewhere on the work vehicle 10. For example, sensors 112 may include one or more pressure sensors that observe a pressure within the hydraulic circuit. The sensors 112 may also observe a pressure associated with the hydraulic pumps 46.

In certain embodiments, one or more sensors 114 are coupled to the work vehicle 10 to observe a velocity or speed of the work vehicle 10 and generate sensor signals based thereon. In one example, the one or more sensors 114 comprise wheel speed sensors, which observe a speed of the driven wheels 18 and generate sensor signals based thereon. Based on the speed of the driven wheels 18, the controller 44 determines a speed of the work vehicle 10. It should be noted that in some embodiments, the speed of the work vehicle 10 can be modeled based on a speed (revolutions per minute) of the engine 14, if desired.

The various components noted above (or others) may be utilized to control movement of the work vehicle 10 by controlling the one or more hydraulic pistons associated with the wet clutches 62, 64, the synchronizers 66, 68, the one or more traction clutches 30, the park dog tooth collar 24 and the dog clutch 96. Accordingly, these components may be viewed as forming part of the creeper mode selection system for the transmission 16 of the work vehicle 10. Each of the sensors 100, 102, 112, 114; and the human-machine interface 104, can be in communication with the controller 44 via a suitable communication architecture that facilitates the transfer of data, power, commands, etc., such as the CAN bus.

Figure 3:
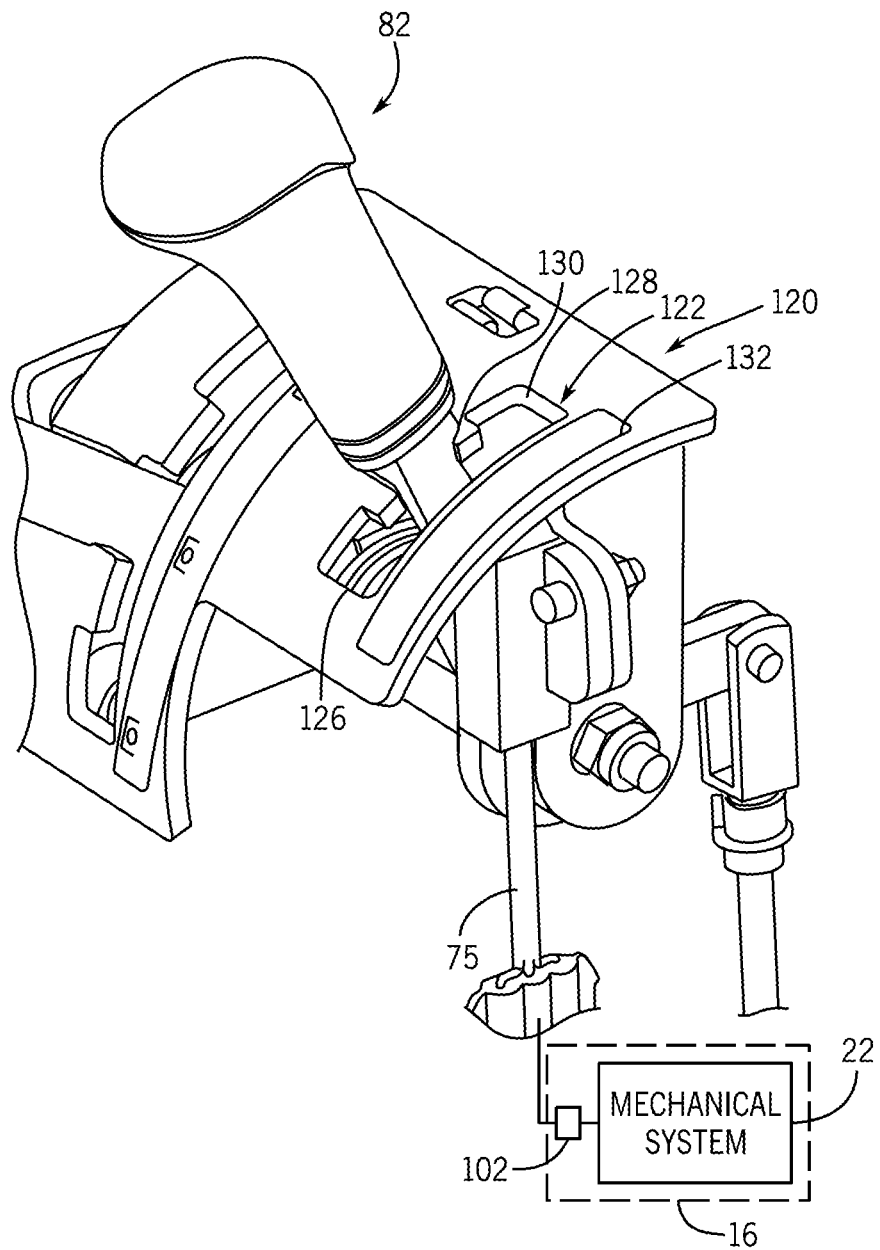
FIG. 3 is a partial front perspective view of an example creeper mode selection lever for the transmission of the work vehicle of FIG. 1.

With reference to FIG. 3, a portion of the human-machine interface 104 is shown in greater detail. In this figure, the creeper mode selection lever 82 is shown movably coupled to a housing 120. It should be noted, however, that the creeper mode selection lever 82, the gear selector lever 90 and the one or more range mode selection input devices 110 can be coupled to the same housing, if desired. In this example, the housing 120 defines at least a first gate 122. The first gate 122 receives the creeper mode selection lever 82, such that the creeper mode selection lever 82 is movable within the first gate 122. Thus, the first gate 122 defines a path of movement for the creeper mode selection lever 82, which enables the operator to select the desired creeper gear ranges.

In this example, the first gate 122 defines a high range detent or position 126, a low range detent or position 128 and a range neutral detent or position 130. In this example, a label 132 is positioned next to the first gate 122 to illustrate the creeper gear ranges associated with the creeper mode selection lever 82. It should be understood, however, that any suitable user interface can be employed to convey the available creeper gear ranges to the operator, including, but not limited to, the display 108 positioned within the cab 106, etc.

Figure 4:
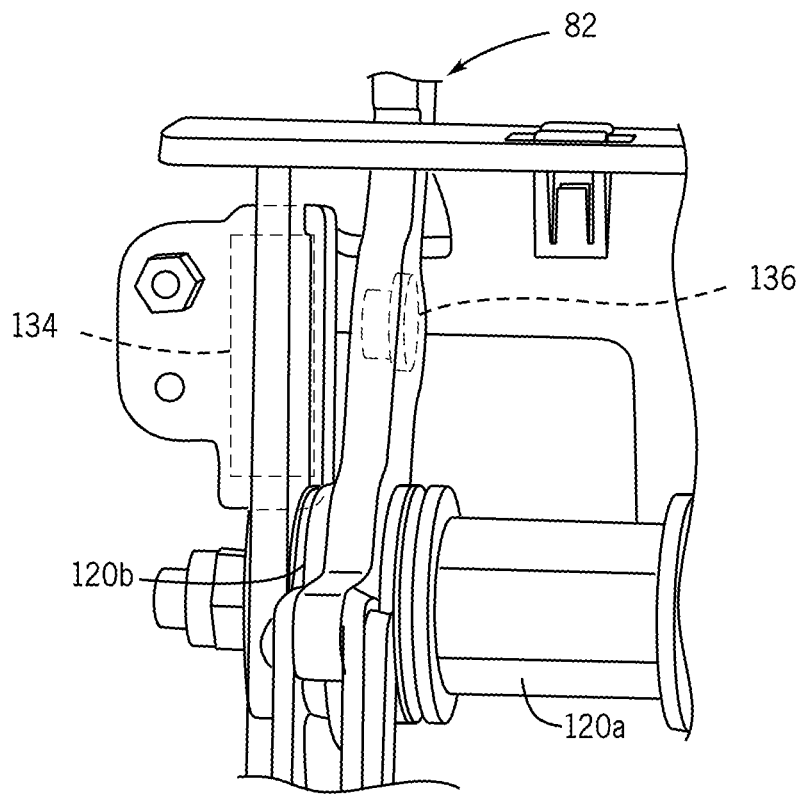
FIG. 4 is a partial rear perspective view of the creeper mode selection lever of FIG. 3.

With reference to FIG. 4, the housing 120 also includes a position sensor 134, which observes a position of the creeper mode selection lever 82 and generates sensor signals based thereon. In one example, the position sensor 134 comprises a Hall effect sensor, which is responsive to a magnet 136 coupled to the creeper mode selection lever 82. The magnet 136 generally comprises a permanent magnet, which is composed of a ferromagnetic material. The magnet 136 is coupled to the creeper mode selection lever 82 via one or more mechanical fasteners, such as bolts. In certain embodiments, the magnet 136 is also coupled to the creeper mode selection lever 82 via adhesives. Generally, the permanent magnet is coupled to a shaft of the creeper mode selection lever, so as to be spaced apart from a knob associated with the creeper mode selection lever. It should be noted, however, that the magnet 136 can be integrally formed with the creeper mode selection lever 82, if desired, and can be coupled to the creeper mode selection lever 82 at any desired location.

In this example, the position sensor 134 is coupled to the housing 120 via one or more mechanical fasteners, for example, so as to be adjacent to the range neutral position 130 of the first gate 122. The creeper mode selection lever 82 is coupled to the housing 120 via a linkage or shaft 120a and positioned within the first gate 122 such that the creeper mode selection lever 82 has to be moved in a lateral direction, towards the position sensor 134, to shift between the various creeper gear ranges, as shown in FIG. 4. Generally, the creeper mode selection lever 82 is movable laterally by compressing at least one biasing member, for example, at least one Belleville spring 120b. Once the lateral force is removed, the Belleville spring 120b biases the creeper mode selection lever 82 into the selected detent or position. Thus, the creeper mode selection lever 82 is generally coupled to the housing 120 so as to be pivotable within the first gate 122 to select one of the various creeper gear ranges. The creeper mode selection lever 82 can be coupled to the shaft 120a via a bearing, or bushing, for example, to enable pivotal movement of the creeper mode selection lever 82. As the creeper mode selection lever 82 moves out of the range neutral position 130, the magnet 136 is moved adjacent to the position sensor 134, causing the position sensor 134 to observe an increase in a voltage based on an increase in the strength associated with the magnetic field of the magnet 136. The sensor signals or sensor data from the position sensor 134 are communicated to the controller 44 via a suitable communication architecture that facilitates the transfer of data, power, commands, etc., such as the CAN bus. It should be noted that the use of the Hall effect sensor is merely exemplary, as any suitable sensor can be employed to observe a position of the creeper mode selection lever 82. The controller 44 determines a movement of the creeper mode selection lever 82 based on the sensor signals received from the position sensor 134.

Figure 5:
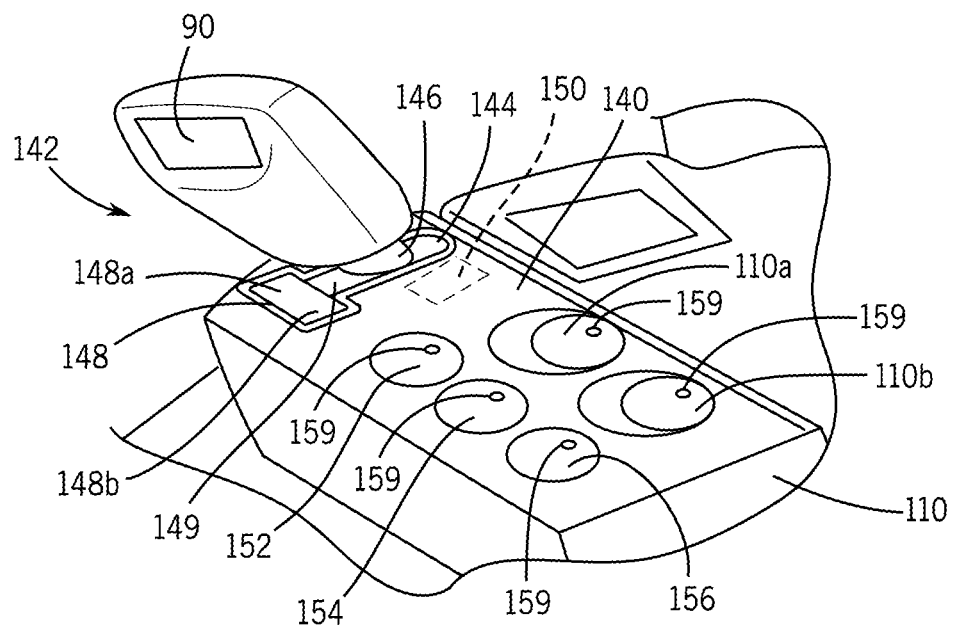
FIG. 5 is a partial perspective view of a gear selector lever and range mode selection input device for use with the transmission of the work vehicle of FIG. 1.

With reference to FIG. 5, a portion of the human-machine interface 104 is shown in greater detail. In this figure, the gear selector lever 90 and the one or more range mode selection input devices 110 are shown coupled to a second housing 140. It should be noted, however, that the creeper mode selection lever 82, the gear selector lever 90 and the one or more range mode selection input devices 110 can be coupled to the same housing, if desired. In this example, the second housing 140 defines a second gate 142. The second gate 142 receives the gear selector lever 90, such that the gear selector lever 90 is movable within the second gate 142. Thus, the second gate 142 defines a path of movement for the gear selector lever 90, which enables the operator to select the desired gear ranges for the electrohydraulic system 20 of the transmission 16.

In one example, the second gate 142 defines an automatic range detent or position 144 and a manual range detent or position 148. In the automatic range position 144, the controller 44 cooperates with another input device (not shown) of the human-machine interface 104, such as a dial, to engage one of the gear ranges based on a speed for the work vehicle that is selected by the operator (via the dial). Generally, in the automatic range position, the controller 44 substantially automatically shifts between the gear ranges based on the input selected speed and a speed of the work vehicle as observed by the one or more sensors 114. The manual range position 148 can include a shift up gear range 148a and a shift down gear range 148b, which enable the operator to increase or decrease a current gear range during the operation of the work vehicle 10. For example, if the current gear range is the third gear 54, a movement of the gear selector lever 90 into the plus gear range 148a transmits a signal to the controller 44 to change the current gear 32 to the fourth gear 56. Similarly, if the current gear range is the third gear 54, a movement of the gear selector lever 90 into the minus gear range 148b transmits a signal to the controller 44 to change the current gear 32 to the second gear 52. Thus, the second housing 140 also includes a second position sensor 150, which observes a position of the gear selector lever 90 within the second gate 142 and generates sensor signals based thereon. In one example, the second position sensor 150 is an optical sensor; however, any sensor can be used to observe a position of the gear selector lever 90. The second position sensor 150 can be in communication with the controller 44 via a suitable communication architecture that facilitates the transfer of data, power, commands, etc., such as the CAN bus.

The one or more range mode selection input devices 110 are coupled to and movable relative to the second housing 140. In this example, the one or more range mode selection input devices 110 comprise a plurality of buttons, which are actuatable by the operator to select a desired range mode. For example, the one or more range mode selection input devices 110 include an A range mode button 152, a B range mode button 154 and a C range mode button 156. The range mode selection input devices 110 can also include a combination of ranges, such as a first combination range mode button 110a and a second combination range mode button 110b. In one example, the combination range mode button 110a selects a BCD range mode, and the second combination range mode button 110b selects a CD range mode. Each of the A range mode button 152, B range mode button 154, C range mode button 156, the first combination range mode button 110a and the second combination range mode button 110b are in communication with the controller 44, via a suitable communication architecture that facilitates the transfer of data, power, commands, etc., such as the CAN bus, such that a signal is transmitted to the controller 44 upon an actuation of the respective one of the A range mode button 152, B range mode button 154, C range mode button 156, the first combination range mode button 110a and the second combination range mode button 110b by the operator.

In addition, each of the A range mode button 152, B range mode button 154, C range mode button 156, the first combination range mode button 110a and the second combination range mode button 110b include a visual indicator 159. In one example, the visual indicator 159 comprises a light emitting diode, which is in communication with the controller 44, over the CAN bus, for example, and responsive to one or more control signals from the controller 44 to illuminate. The visual indicator 159 informs the operator of the range mode selected for the transmission 16.

In various embodiments, the controller 44 includes a transmission selection control module 160, which is embedded within the controller 44. The transmission selection control module 160 controls the selection of one or more gear ranges for the electrohydraulic system 20 based on one or more of the sensor signals received from the sensors 100, 102, 112, 114, 134 and 150; input received from the human-machine interface 104; and further based on the creeper mode selection system and method for the transmission 16 of the present disclosure. The transmission selection control module 160 determines one or more current range modes based on one or more of the sensor signals received from the sensors 100, 112, 114 and 150, input from the human-machine interface 104 and further based on the creeper mode selection system and method for the transmission 16 of the present disclosure. The transmission selection control module 160 outputs one or more control signals to the visual indicators 159 based on one or more of the sensor signals received from the sensors 100, 112, 114 and 150, input from the human-machine interface 104 and further based on the creeper mode selection system and method for the transmission 16 of the present disclosure. The transmission selection control module 160 outputs one or more control signals to the hydraulic pumps 46 and/or control valves 48 to the wet clutches 62, 64, the synchronizers 66, 68, the one or more traction clutches 30, the park dog tooth collar 24 and the dog clutch 96 based on one or more of the sensor signals received from the sensors 100, 102, 112, 114, 134 and 150, input from the human-machine interface 104 and further based on the creeper mode selection system and method for the transmission 16 of the present disclosure. The transmission selection control module 160 can also output one or more user interfaces that indicate a creeper mode selection and/or a current gear range based on one or more of the sensor signals received from the sensors 100, 102, 112, 114, 134 and 150, input from the human-machine interface 104 and further based on the creeper mode selection system and method for the transmission 16 of the present disclosure.

Figure 6:
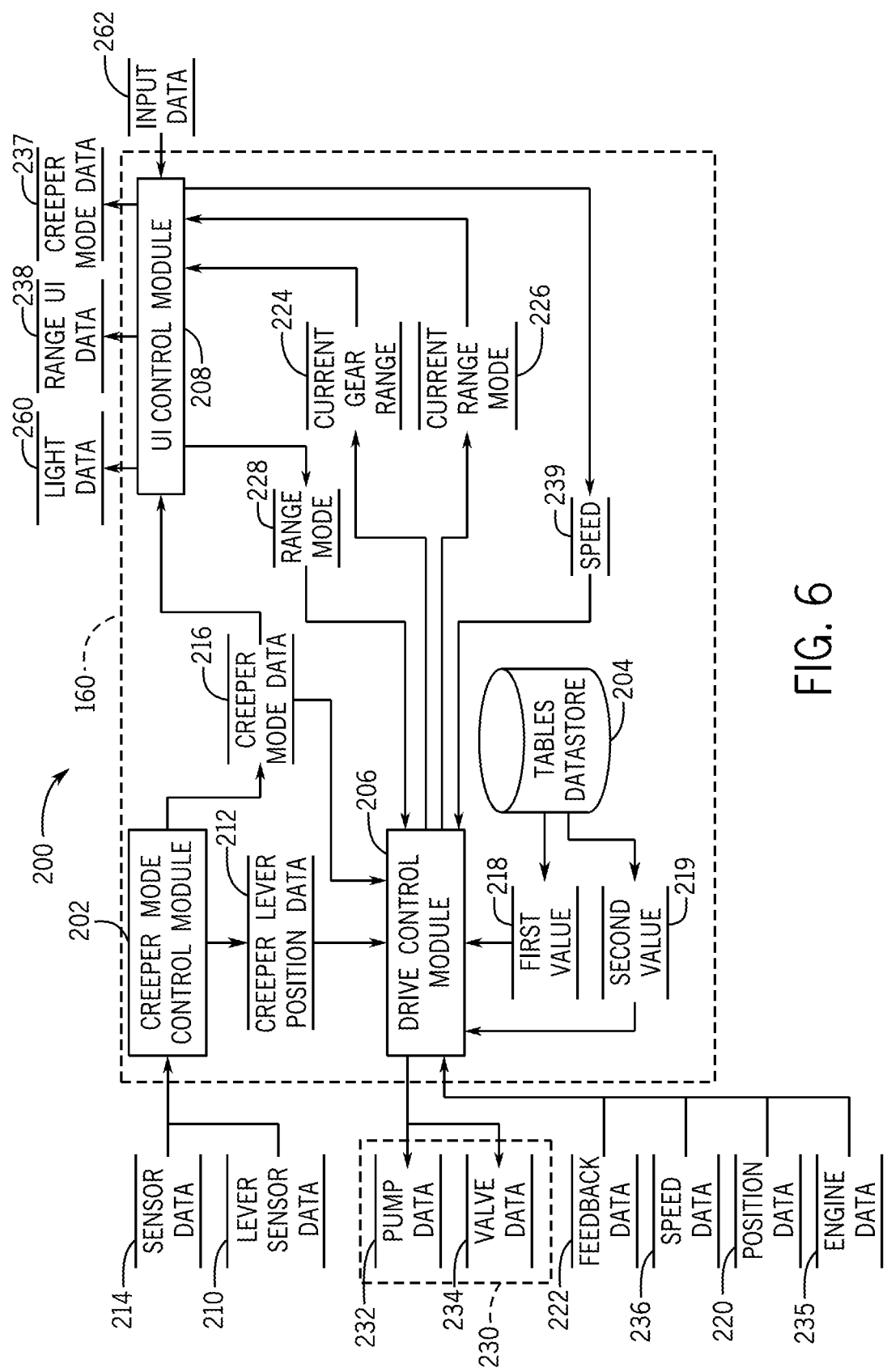
FIG. 6 is a dataflow diagram illustrating an example creeper mode selection system for the transmission of the work vehicle of FIG. 1 in accordance with various embodiments.

Referring now also to FIG. 6, and with continued reference to FIGS. 1, 3 and 5, a dataflow diagram illustrates various embodiments of a creeper mode selection system 200 for the transmission 16 of the work vehicle 10, which may be embedded within the transmission selection control module 160 of the controller 44. Various embodiments of the creeper mode selection system 200 according to the present disclosure can include any number of sub-modules embedded within the transmission selection control module 160 of the controller 44. As can be appreciated, the sub-modules shown in FIG. 6 can be combined and/or further partitioned to similarly determine the creeper mode of the work vehicle 10, the current gear range and the current range mode for the work vehicle 10. Inputs to the creeper mode selection system 200 may be received from the sensors 100, 102, 112, 114, 134 and 150 (FIGS. 1, 3 and 5), the human-machine interface 104 (FIG. 1), received from other control modules (not shown) associated with the work vehicle 10, and/or determined/modeled by other sub-modules (not shown) within the controller 44. In various embodiments, the transmission selection control module 160 includes a creeper mode control module 202, a tables datastore 204, a drive control module 206 and a user interface (UI) control module 208.

The creeper mode control module 202 receives as input lever sensor data 210. The lever sensor data 210 comprises the sensor signals or sensor data from the position sensor 134. The creeper mode control module 202 processes the lever sensor data 210 from the position sensor 134 and determines a movement of the creeper mode selection lever 82. For example, the creeper mode control module 202 determines whether the creeper mode selection lever 82 has moved to or from the range neutral position 130 based on the magnetic field observed by the position sensor 134. Generally, the creeper mode control module 202 determines whether the creeper mode selection lever 82 has moved relative to the range neutral position 130 based on the magnetic field observed by the position sensor 134. The creeper mode control module 202 sets the determined movement of the creeper mode selection lever 82 as creeper lever position data 212 for the drive control module 206.

The creeper mode control module 202 receives as input sensor data 214. The sensor data 214 comprises the sensor signals or sensor data from the sensors 102. The creeper mode control module 202 processes the sensor data 214 from the sensors 102 and determines a mode of the creeper gear shift collar 74. For example, the creeper mode control module 202 determines whether the creeper gear shift collar 74 is engaged with the high range creeper gear 70 or engaged with the low range creeper gear 72. The creeper mode control module 202 sets the determined mode of the creeper gear shift collar 74 as creeper mode data 216 for the drive control module 206 and the UI control module 208. Thus, creeper mode control module 202 determines whether the transmission 16 is operating in the creeper high range (i.e. high range creeper gear 70 engaged) or creeper low range (i.e. low range creeper gear 72 engaged).

The tables datastore 204 stores one or more tables (e.g., lookup tables) that indicate one or more values to command the hydraulic circuit, such as the hydraulic pumps 46 and/or control valves 48, to obtain a selected gear range and range mode for the electrohydraulic system 20 of the transmission 16. In other words, the tables datastore 204 stores one or more tables that provide a first value 218 and a second value 219. The first value 218 is a value (e.g. a hydraulic pressure) for the hydraulic pumps 46 and/or control valves 48 of the hydraulic circuit to control the associated hydraulic pistons of the wet clutches 62, 64, to position the respective ones of the wet clutches 62, 64 based on a current gear range and a selected gear range. In various embodiments, the tables may be interpolation tables that are defined by one or more indices. The tables can comprise calibration tables, which are populated based on experimental data. As an example, one or more tables can be indexed by current gear range and selected gear range to provide the first value 218. The second value 219 is a value (e.g. a hydraulic pressure) for the hydraulic pumps 46 and/or control valves 48 of the hydraulic circuit to control the associated hydraulic pistons of the synchronizers 66, 68 to position the respective ones the synchronizers 66, 68 based on a current range mode and a selected range mode. In various embodiments, the tables may be interpolation tables that are defined by one or more indices. The tables can comprise calibration tables, which are populated based on experimental data. As an example, one or more tables can be indexed by current range mode and selected range mode to provide the second value 219.

The drive control module 206 receives as input position data 220. The position data 220 comprises the sensor signals or sensor data from the second position sensor 150. The drive control module 206 processes the position data 220 from the second position sensor 150, and based on the position data 220, the drive control module 206 determines a position of the gear selector lever 90. If the gear selector lever 90 is determined to be in the automatic range position 144, the drive control module 206 receives as input the speed data 236 and a speed 239. The speed data 236 comprises the sensor signals or sensor data from the sensors 114. The drive control module 206 processes the speed data 236 and determines the speed of the work vehicle 10. The speed 239 comprises an operator defined speed for the work vehicle 10, which is received as input to the human-machine interface 104. Based on the speed data 236 and the speed 239, the drive control module 206 determines the selected gear range to achieve the input speed. Generally, the drive control module 206 determines the selected gear range based on default or calibration values, which are stored in a memory associated with the drive control module 206. Alternatively, the drive control module 206 queries a gear range datastore, which stores the gear ranges based on the speed data 236 and/or the speed 239. In this example, the gear range datastore stores one or more look-up tables, which provide a selected gear range based on the speed of the work vehicle 10 and the desired speed for the work vehicle 10 (based on the speed 239 received as input). The look-up tables can be defined based on experimental or calibration data.

If the gear selector lever 90 is determined to be in the manual range position 148, such as in the plus gear range 148a or the minus gear range 148b, the drive control module 206 determines whether an increase in a current gear range or a decrease in the current gear range is selected.

The drive control module 206 receives as input feedback data 222. The feedback data 222 comprises sensor signals or sensor data from the sensors 100. The drive control module 206 processes the feedback data 222 and determines a current gear range 224 (i.e. first, second, third or fourth) and a current range mode 226 (i.e. A, B, C, BCD or CD) for the electrohydraulic system 20 of the transmission 16. The drive control module 206 sets the determined current gear range 224 and the current range mode 226 for the UI control module 208. The drive control module 206 also determines whether the transmission 16 is operating in a valid range mode based on the feedback data 222.

The drive control module 206 also receives as input a range mode 228 from the UI control module 208. The range mode 228 comprises the range mode (A, B, C, BCD or CD) selected by the operator via the human-machine interface 104. The drive control module 206 determines based on the range mode 228 whether the operator is selecting a valid range mode (A, B, C, BCD or CD). In certain embodiments, if the range mode selected by the operator is not valid, the drive control module 206 flags an error for display on the display 108. The drive control module 206 saves the last known or last selected range mode 228 received from the UI control module 208 in a memory associated with the drive control module 206.

Based on the determined gear range and the current gear range 224, the drive control module 206 queries the tables datastore 204 and retrieves the first value 218. Based on the retrieved first value 218, the drive control module 206 outputs transmission control data 230. In one example, the transmission control data 230 comprises pump data 232 and/or valve data 234. The pump data 232 comprises one or more control signals to the hydraulic pumps 46 to drive the one or more hydraulic pumps 46 to control a supply of hydraulic fluid to the hydraulic circuit to control a respective hydraulic piston associated with one or more of the wet clutches 62, 64 to change the current gear range 224 to the selected gear range. The valve data 234 comprises one or more control signals to the control valves 48 to control a supply of hydraulic fluid to the hydraulic circuit to control a respective hydraulic piston associated with one or more of the wet clutches 62, 64 to change the current gear range 224 to the selected gear range. The phrase "selected gear range" as used herein denotes a gear range selected substantially automatically based on the speed 239 input by the operator and the speed of the work vehicle 10 from the sensors 114 or the selection to increase or decrease a current gear range based on a movement of the gear selector lever 90 in the manual range position 148.

Based on the range mode 228 and the current range mode 226, the drive control module 206 determines whether the high range creeper gear 70 or low range creeper gear 72 is engaged based on the creeper mode data 216. If the high range creeper gear 70 or low range creeper gear 72 is engaged, the drive control module 206 does not output transmission control data 230. Otherwise, if the high range creeper gear 70 or low range creeper gear 72 is not engaged based on the creeper mode data 216 and the range mode 228 is a valid range mode (i.e. one of the A range mode, B range mode, C range mode, BCD range mode or CD range mode), the drive control module 206 receives as input the creeper lever position data 212. Based on the creeper lever position data 212 indicating that the creeper mode selection lever 82 has not moved from the range neutral position 130, the drive control module 206 queries the tables datastore 204 and retrieves the second value 219. Based on the retrieved second value 219, the drive control module 206 outputs the transmission control data 230. In one example, the transmission control data 230 comprises the pump data 232 and/or the valve data 234. The pump data 232 comprises one or more control signals to the hydraulic pumps 46 to drive the one or more hydraulic pumps 46 to control a supply of hydraulic fluid to control a respective hydraulic piston associated with one or more of the synchronizers 66, 68 to change the current range mode 226 to the range mode 228. The valve data 234 comprises one or more control signals to the control valves 48 to control a supply of hydraulic fluid to the hydraulic circuit to control a respective hydraulic piston associated with one or more of the synchronizers 66, 68 to change the current range mode 226 to the range mode 228.

If the creeper lever position data 212 indicates that the creeper mode selection lever 82 is moving from the range neutral position 130, the drive control module 206 does not output the transmission control data 230 to change the current range mode 226 to the range mode 228.

If the creeper lever position data 212 indicates that the creeper mode selection lever 82 has returned to the range neutral position 130, the drive control module 206 queries the tables datastore 204 and retrieves the second value 219 associated with the last known or last selected range mode 228. Based on the retrieved second value 219, the drive control module 206 outputs the transmission control data 230. In one example, the transmission control data 230 comprises the pump data 232 and/or the valve data 234. The pump data 232 comprises one or more control signals to the hydraulic pumps 46 to drive the one or more hydraulic pumps 46 to control a supply of hydraulic fluid to control a respective hydraulic piston associated with one or more of the synchronizers 66, 68 to change the range mode 228. The valve data 234 comprises one or more control signals to the control valves 48 to control a supply of hydraulic fluid to the hydraulic circuit to control a respective hydraulic piston associated with one or more of the synchronizers 66, 68 to move to the last known range mode 228.

The drive control module 206 also receives as input the creeper lever position data 212. Based on the creeper lever position data 212 indicating that the creeper mode selection lever 82 is moving from the range neutral position 130 and the determination that the current range mode 226 is a valid range (i.e. one of the A range mode, B range mode, C range mode, BCD range mode or CD range mode), in certain embodiments, the drive control module 206 can receive as input the speed data 236. The drive control module 206 processes the speed data 236 and determines whether the speed of the work vehicle 10 is below a speed threshold, for example, about 5 kilometers per hour (kph). Based on the creeper lever position data 212 indicating the creeper mode selection lever 82 is not in the range neutral position 130 and the speed of the work vehicle 10 as below the speed threshold, the drive control module 206 queries the tables datastore 204 to retrieve the second value 219 required to move the synchronizers 66, 68 from the current range mode 226 to the range neutral mode. In certain instances, the transmission control data 230 comprises the one or more control signals to the hydraulic pumps 46 and/or control valves 48 to stop the flow of hydraulic fluid through the hydraulic circuit to the synchronizers 66, 68 to change the current range mode 226 to the range neutral mode. In the example of spring-centered synchronizers 66, 68, the retrieved second value 219 for the synchronizers 66, 68 can be zero, or another value that indicates to stop the flow of hydraulic fluid through the hydraulic circuit to the synchronizers 66, 68. Based on the retrieved second value 219, the drive control module 206 outputs the transmission control data 230 to move the synchronizers 66, 68 to their respective neutral positions. Thus, the transmission control data 230 generally comprises one or more control signals that control a flow of hydraulic fluid through the hydraulic circuit associated with the work vehicle 10 to control a position of the wet clutches 62, 64 and the synchronizers 66, 68.

The drive control module 206 also receives as input engine data 235. The engine data 235 comprises a status of the engine 14, which can be received from other modules associated with the controller 44. For example, the status comprises engine off or engine running. The engine status can inform the creeper mode selection system and control method for the transmission 16.

The UI control module 208 receives as input the creeper mode data 216. Based on the creeper mode data 216, the UI control module 208 outputs creeper mode user interface (UI) data 237 for display on the display 108. The creeper mode UI data 237 comprises a graphical and/or textual notification of the current creeper gear range, based on the creeper mode data 216. For example, the creeper mode UI data 237 comprises a graphical icon of a snail, with a textual letter of L that indicates the low range creeper gear 72 is engaged or a textual letter of H that indicates the high range creeper gear 70 is engaged. It should be noted that the creeper mode UI data 237 is merely exemplary, as any suitable graphical and/or textual indicator can be employed to convey the current creeper gear range to the operator.

The UI control module 208 also receives as input the current gear range 224 and the current range mode 226. Based on the current gear range 224 and the current range mode 226, the UI control module 208 outputs range user interface (UI) data 238 for display on the display 108. The range UI data 238 comprises a graphical and/or textual notification of the current gear range and current range mode, based on the current gear range 224 and the current range mode 226. For example, the range UI data 238 comprises a textual letter of one of $1^{st}$, $2^{nd}$, $3^{rd}$ or $4^{th}$ that indicates which gear range is engaged ($1^{st}$ for first gear range; $2^{nd}$ for second gear range; $3^{rd}$ for third gear range; $4^{th}$ for fourth gear range) and one or more textual letter of A, B, C, BCD, CD that indicates which range mode is engaged (A for A range mode; B for B range mode; C for C range mode; BCD for the combination of B range mode, C range mode and D range mode; and CD for the combination of C range mode and D range mode). It should be noted that the range UI data 238 is merely exemplary, as any suitable graphical and/or textual indicator can be employed to convey the current gear range and current range mode to the operator.

Based on the current range mode 226, the UI control module 208 also outputs light data 260. The light data 260 comprises one or more control signals for a respective one of the visual indicators 159 to illuminate based on the current range mode 226.

The UI control module 208 also receives input data 262 as input from the human-machine interface 104. The UI control module 208 processes the input data 262, and determines which of the range mode selection input devices 110 has been selected by the operator. The UI control module 208 sets the operator selected range mode as the range mode 228. The UI control module 208 also processes the input data 262, and determines the speed of the work vehicle 10 that has been selected by the operator. The UI control module 208 sets the operator selected speed as the speed 239.

Figure 7:
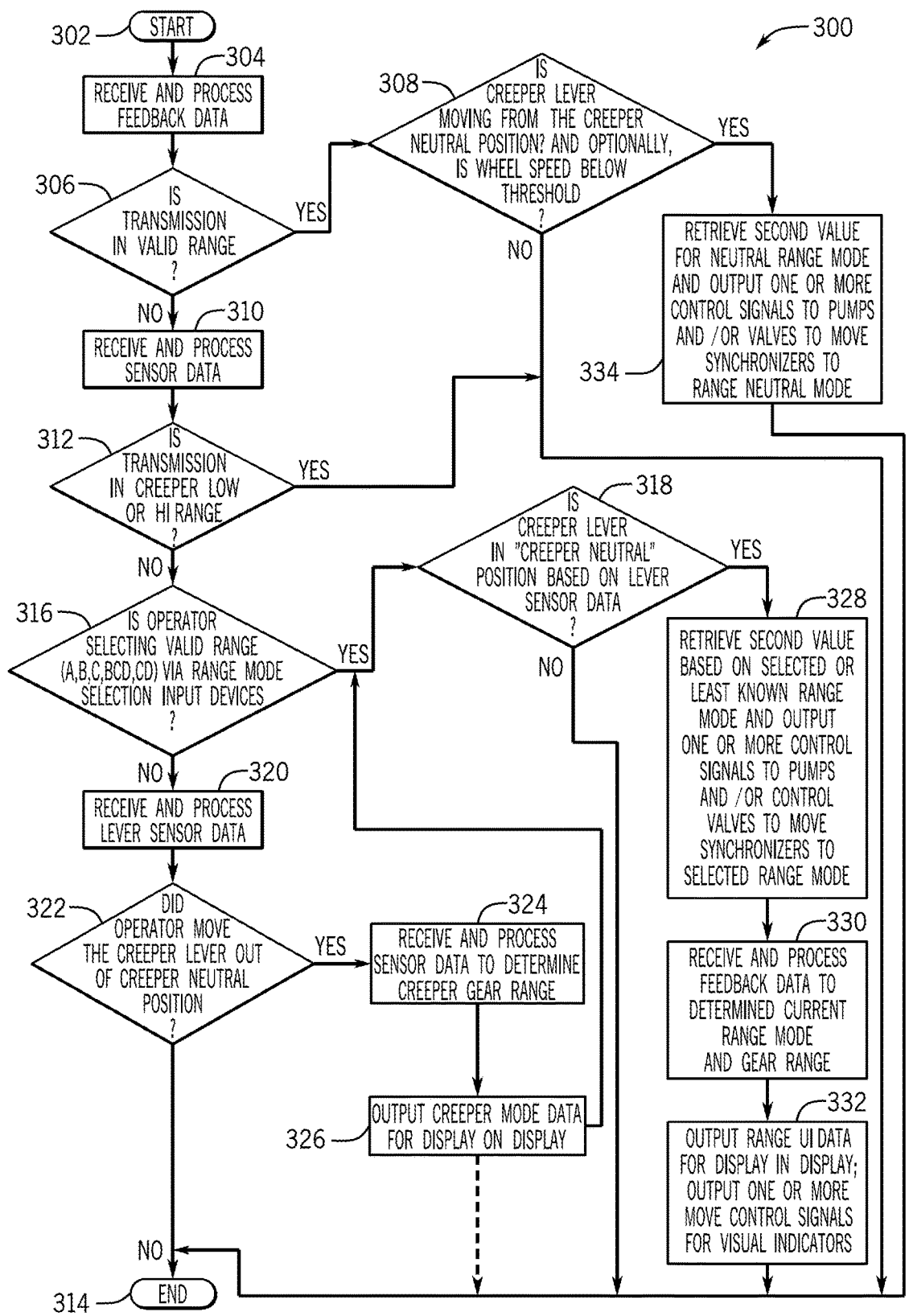
FIG. 7 is a flowchart illustrating an example control method of the creeper mode selection system of FIG. 1 in accordance with various embodiments.

Referring now also to FIG. 7, and continued reference to FIGS. 1, 3, 5 and 6, a flowchart illustrates a control method 300 that may be performed by the transmission selection control module 160 of the controller 44 of FIGS. 1 and 6 in accordance with the present disclosure. As can be appreciated in light of the disclosure, the order of operation within the method is not limited to the sequential execution as illustrated in FIG. 7, but may be performed in one or more varying orders as applicable and in accordance with the present disclosure.

In various embodiments, the method may be scheduled to run based on predetermined events, such as based on the receipt of the creeper lever position data 212 that indicates a change in a position of the creeper mode selection lever 82, or periodically.

In one example, with reference to FIG. 7, the method begins at 302. At 304, the method receives and processes the feedback data 222. At 306, the method determines whether the current range mode 226 of the transmission 16 is one of the A range mode, the B range mode, the C range mode, the BCD range mode or the CD range mode. If true, the method proceeds to 308.

If false, at 310, the method receives and processes the sensor data 214. At 312, the method determines, based on the creeper mode data 216, whether the creeper gear shift collar 74 is engaged with the high range creeper gear 70 or the low range creeper gear 72. If true, the method ends at 314.

Otherwise, at 316, the method determines whether input data 262 has been received via the range mode selection input devices 110 that indicate the operator is selecting one of the range modes. If an operator selection has been received via the range mode selection input devices 110, the method proceeds to 318. Otherwise, at 320, the method receives and processes the lever sensor data 210. At 322, the method determines whether the operator has moved the creeper mode selection lever 82 out of the range neutral position 130 based on the lever sensor data 210. In this regard, the method determines whether there has been a change in the strength of the magnetic field that indicates the movement of the creeper mode selection lever 82 relative to the position sensor 134, such as a movement of the creeper mode selection lever 82 out of the range neutral position 130.

If the lever sensor data 210 indicates that the creeper mode selection lever 82 has been moved out of the range neutral position 130, at 324, the method receives and processes the sensor data 214 to determine whether the creeper gear shift collar 74 is engaged with the respective one of the high range creeper gear 70 or the low range creeper gear 72. In certain instances, the method also outputs one or more control signals to the hydraulic pumps 46 and/or control valves 48 of the hydraulic circuit to drive the respective hydraulic pistons associated with the wet clutches 62, 64 and the synchronizers 66, 68 to the respective neutral position based on a conflict between the lever sensor data 210 and the sensor data 214. For example, if the lever sensor data 210 indicates the creeper mode selection lever 82 has been moved out of the range neutral position 130, but the sensor data 214 indicates that the creeper gear shift collar 74 is engaged with neither one of the high range creeper gear 70 or the low range creeper gear 72. In this instance, the method can also output an error notification for display on the display 108.

At 326, based on the determined creeper mode data 216, the method outputs the creeper mode UI data 237 for display on the display 108, which indicates the determined creeper mode. The method proceeds to 318. By proceeding to 318, the method can substantially automatically return the electrohydraulic system 20 of the transmission 16 to the last known selected range mode. Optionally, the method ends at 314.

Otherwise, at 322, if the creeper mode selection lever 82 has not been moved to either the high range position 126 or the low range position 128, the method ends at 314.

At 318, if the operator selection has been received via the range mode selection input devices 110, the method determines whether the creeper mode selection lever 82 is in the range neutral position 130 based on the lever sensor data 210. If the creeper mode selection lever 82 is not in the range neutral position 130, the method ends at 314. Otherwise, at 328, based on the range mode 228 selected or the last known selected range mode 228, the method queries the tables datastore 204 and retrieves the second value 219. The method outputs one or more control signals to the hydraulic pumps 46 and/or control valves 48 of the hydraulic circuit to drive the respective hydraulic pistons associated with the synchronizers 66, 68 to move the synchronizers 66, 68 to the selected range mode. At 330, the method receives and processes the feedback data 222 to determine the current gear range 224 and the current range mode 226. At 332, based on the current gear range 224 and the current range mode 226, the method outputs the range UI data 238, which indicates the current range (gear range and range mode) of the transmission 16 for display on the display 108. The method also outputs the one or more control signals to the respective visual indicator 159 to illuminate the visual indicator 159 associated with the current range mode 226. The method ends at 314.

In certain instances, the method also outputs one or more control signals to the hydraulic pumps 46 and/or control valves 48 of the hydraulic circuit to drive the respective hydraulic pistons associated with the wet clutches 62, 64 and the synchronizers 66, 68 to the respective neutral position based on a difference between the selected range mode 228 and the current range mode 226. In this instance, the method can also output an error notification for display on the display 108.

If the current range mode 226 of the transmission 16 is one of the A range mode, the B range mode, the C range mode, the BCD range mode or the CD range mode, at 308, the method receives and processes the lever sensor data 210 to determine whether the creeper mode selection lever 82 is being moved from the range neutral position 130. Optionally, at 308, the method also receives and processes the speed data 236 to determine whether the speed of the work vehicle 10 is less than the speed threshold. If the creeper mode selection lever 82 is not being moved from the range neutral position 130, and optionally, the speed of the work vehicle 10 is not less than the speed threshold, the method ends at 314.

Otherwise, at 334, the method retrieves the second value 219 from the tables datastore 204 for the range neutral mode and, in this example, outputs one or more control signals to the hydraulic pumps 46 and/or control valves 48 of the hydraulic circuit to control the respective hydraulic pistons associated with the synchronizers 66, 68 to stop the flow of hydraulic fluid through the hydraulic circuit, thereby causing the spring-centered synchronizers 66, 68 to move to the range neutral mode. The method ends at 314.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A mechanical creeper mode selection system for a transmission of a work vehicle, the transmission including one or more range modes having one or more range mode shift mechanisms each driven by an electrohydraulic circuit, the system comprising:
    a creeper mode selection lever movable by an operator to select a creeper gear range;
    a sensor that observes a position of the creeper mode selection lever and generates sensor signals based thereon; and
    a controller that processes the sensor data to determine a movement of the creeper mode selection lever and outputs one or more control signals to the electrohydraulic circuit to position the one or more range mode shift mechanisms in a range neutral mode based on the movement of the creeper mode selection lever.

2. The mechanical creeper mode selection system of claim 1, wherein the creeper gear range comprises a high creeper gear range, a low creeper gear range and a creeper neutral gear range, and the controller outputs the one or more control signals based on the movement of the creeper mode selection lever out of the creeper neutral gear range.

3. The mechanical creeper mode selection system of claim 2, wherein the controller receives a selection of a range mode from a source of input, determines a position of the creeper mode selection lever based on the sensor signals and outputs one or more control signals to the hydraulic circuit to position the one or more range mode shift mechanisms in the selected range mode based on the position of the creeper mode selection lever in the creeper neutral detent.

4. The mechanical creeper mode selection system of claim 1, wherein the creeper mode selection lever includes a magnet, and the sensor is responsive to the magnet to generate the sensor signals.

5. The mechanical creeper mode selection system of claim 4, wherein the creeper mode selection lever is movable within a gate defined in a housing, and the sensor is coupled to the housing.

6. The mechanical creeper mode selection system of claim 5, wherein the gate defines a high creeper range detent, a low creeper range detent and a creeper range neutral detent, and the sensor is coupled adjacent to the creeper range neutral detent to observe the position of the creeper mode selection lever relative to the creeper range neutral detent.

7. The mechanical creeper mode selection system of claim 1, further comprising a source of a speed of the work vehicle, wherein the controller outputs the one or more control signals based on the speed of the work vehicle.

8. The mechanical creeper mode selection system of claim 1, wherein the one or more range mode shift mechanisms comprise one or more synchronizers, and the controller outputs the one or more control signals to stop a flow of hydraulic fluid to the one or more synchronizers based on the movement of the creeper mode selection lever.

9. A method for selecting a mechanical creeper mode for a transmission of a work vehicle, the transmission including one or more range modes having one or more synchronizers driven by an electrohydraulic circuit, the method comprising:
observing a position of a creeper mode selection lever with a sensor;
determining, with a processor, a movement of the creeper mode selection lever based on signals from the sensor; and
outputting, with the processor, one or more control signals to the electrohydraulic circuit to direct a flow of hydraulic fluid to position the one or more synchronizers in a range neutral mode based on the movement of the creeper mode selection lever.

10. The method of claim 9, wherein the creeper mode selection lever is movable within a gate defined in a housing, and the observing the movement of the creeper mode selection lever further comprises:
observing the movement of the creeper mode selection lever relative to the housing with the sensor, the sensor coupled to the housing.

11. The method of claim 10, wherein the gate defines a high creeper range detent, a low creeper range detent and a creeper range neutral detent, and determining, with the processor, the movement further comprises:
determining that the creeper mode selection lever is moving from the creeper range neutral detent.

12. The method claim 9, wherein the observing the position of the creeper mode selection lever further comprises:
observing a magnetic field generated by a magnet coupled to the creeper mode selection lever with the sensor.

13. The method of claim 9, further comprising receiving a source of a speed of the work vehicle, and the outputting the one or more control signals is further based on the speed of the work vehicle.

14. The method of claim 9, further comprising:
receiving a selection of a range mode from a source of input;
determining, with the processor, the position of the creeper mode selection lever based on the signals from the sensor; and
outputting, with the processor, one or more control signals to the electrohydraulic circuit to direct a flow of hydraulic fluid to position the one or more synchronizers in the selected range mode based on the position of the creeper mode selection lever.

15. A mechanical creeper mode selection system for a transmission of a work vehicle, the transmission including one or more range modes having one or more synchronizers driven by an electrohydraulic circuit, the system comprising:
a creeper mode selection lever movable by an operator in a gate to select a creeper gear range, the gate including at least a high creeper detent, a low creeper detent and a creeper neutral detent;
a sensor coupled to the housing that observes a position of the creeper mode selection lever in the gate and generates sensor signals based thereon; and
a controller that processes the sensor data to determine a movement of the creeper mode selection lever in the gate and outputs one or more control signals to the electrohydraulic circuit to position the one or more synchronizers in a range neutral mode based on the movement of the creeper mode selection lever from the creeper neutral detent.

16. The creeper mode selection system of claim 15, wherein the creeper mode selection lever includes a magnet, and the sensor is responsive to the magnet to generate the sensor signals.

17. The creeper mode selection system of claim 16, wherein the gate is defined in a housing, and the sensor is coupled to the housing adjacent to the creeper neutral detent.

18. The creeper mode selection system of claim 15, further comprising a source of a speed of the work vehicle, wherein the controller outputs the one or more control signals based on the speed of the work vehicle.

19. The creeper mode selection system of claim 15, wherein the controller outputs the one or more control signals to stop a flow of hydraulic fluid to the one or more synchronizers based on the position of the creeper mode selection lever.

20. The creeper mode selection system of claim 15, wherein the controller determines a position of the creeper mode selection lever based on the sensor signals and outputs one or more control signals to the electrohydraulic circuit to position the one or more synchronizers in a previously selected range mode based on the position of the creeper mode selection lever in the creeper neutral detent.

* * * * *